(12) United States Patent
Grosskopf et al.

(10) Patent No.: US 11,466,741 B2
(45) Date of Patent: Oct. 11, 2022

(54) DISC BRAKE HAVING AN ACTUATION DEVICE

(71) Applicant: WABCO Europe BVBA, Brussels (BE)

(72) Inventors: Ralf Grosskopf, Lobach (DE); Paul Henning, Schwetzingen (DE); Wieslaw Strzala, Byczyna (PL)

(73) Assignee: WABCO Europe BVBA, Brussels (BE)

( * ) Notice: Subject to any disclaimer, the term of this patent is extended or adjusted under 35 U.S.C. 154(b) by 136 days.

(21) Appl. No.: 16/648,361

(22) PCT Filed: Sep. 21, 2017

(86) PCT No.: PCT/EP2017/001120
§ 371 (c)(1),
(2) Date: Mar. 18, 2020

(87) PCT Pub. No.: WO2019/057263
PCT Pub. Date: Mar. 28, 2019

(65) Prior Publication Data
US 2020/0224740 A1 Jul. 16, 2020

(51) Int. Cl.
*F16D 65/52* (2006.01)
(52) U.S. Cl.
CPC ...... *F16D 65/52* (2013.01); *F16D 2250/0084* (2013.01)
(58) Field of Classification Search
CPC ...... F16D 65/52; F16D 65/183; F16D 55/226; F16D 65/0068; F16D 65/568; F16D 2055/0016; F16D 65/60; F16D 2041/0605; F16D 2125/582; F16D 41/206; F16D 65/38; F16D 65/54; F16D 65/64; F16D 2065/383
See application file for complete search history.

(56) References Cited

U.S. PATENT DOCUMENTS 3,111,822 A * 11/1963 Hansen ................... F16D 49/04
464/40
4,321,986 A * 3/1982 Thistleton ............. F16D 65/567
188/196 F
4,354,581 A * 10/1982 Birkenbach ............. F16D 65/18
188/71.9

(Continued)

FOREIGN PATENT DOCUMENTS

CN 101093000 A 12/2007
CN 101349311 A 1/2009
(Continued)

OTHER PUBLICATIONS

European Patent Office, Rijswijk, Netherlands, International Search Report of International Application No. PCT/EP2017/001120, dated Jul. 12, 2018, 3 pages.

*Primary Examiner* — Robert A. Siconolfi
*Assistant Examiner* — Mahbubur Rashid
(74) *Attorney, Agent, or Firm* — Dickinson Wright PLLC (57) ABSTRACT

An adjustment device for a disc brake is operable for adjusting brake pads to compensate wear. The adjustment device includes a guide sleeve in which a wrap spring is arranged a groove ring surrounding the guide sleeve and coupled to a closure cap via a torsion spring, and an opening ring surrounding the groove ring.

9 Claims, 10 Drawing Sheets (56) References Cited

U.S. PATENT DOCUMENTS

| | | | | |
|---|---|---|---|---|
| 4,399,894 | A * | 8/1983 | Tribe | F16D 55/224 188/196 BA |
| 6,213,255 | B1 * | 4/2001 | Neuwirth | F16D 65/183 188/71.9 |
| 8,469,160 | B2 * | 6/2013 | Iraschko | F16D 65/568 188/196 BA |
| 8,596,423 | B2 * | 12/2013 | Iraschko | F16D 65/568 188/71.8 |
| 8,640,833 | B2 * | 2/2014 | Camilo-Martinez | F16D 65/183 188/71.7 |
| 2003/0042099 | A1 * | 3/2003 | Arnold | F16D 41/206 192/41 S |
| 2005/0034935 | A1 * | 2/2005 | Maehara | F16D 65/18 188/71.9 |
| 2006/0118369 | A1 * | 6/2006 | Fischer | F16D 65/568 188/218 XL |
| 2012/0132491 | A1 * | 5/2012 | Camilo-Martinez | F16D 65/568 188/196 F |
| 2013/0237351 | A1 * | 9/2013 | Marion | F16F 15/1216 474/70 |
| 2016/0215835 | A1 * | 7/2016 | Cleary | F16D 55/226 |
| 2016/0215841 | A1 * | 7/2016 | Cleary | F16D 55/225 |
| 2016/0273603 | A1 * | 9/2016 | Sandberg | F16D 65/0043 |
| 2017/0122394 | A1 * | 5/2017 | Sandberg | F16D 65/18 |
| 2017/0254366 | A1 * | 9/2017 | Antchak | F02B 63/04 |
| 2017/0292576 | A1 * | 10/2017 | Henning | F16D 55/2255 |
| 2017/0307035 | A1 * | 10/2017 | Henning | F16D 65/18 |
| 2019/0136925 | A1 * | 5/2019 | Grosskopf | F16D 55/2255 |
| 2020/0217380 | A1 * | 7/2020 | Grosskopf | F16F 1/06 |

FOREIGN PATENT DOCUMENTS

| | | | |
|---|---|---|---|
| CN | 105190078 A | 12/2015 | |
| CN | 205578558 U | 9/2016 | |
| CN | 106523550 A | 3/2017 | |
| CN | 106795931 A | 5/2017 | |
| CN | 107076224 A | 8/2017 | |
| CN | 107110258 A | 8/2017 | |
| DE | 40 34 165 A1 | 12/1991 | |
| DE | 102011051073 A1 | 12/2012 | |
| DE | 20 2014 002459 U1 | 4/2014 | |
| DE | 102014009002 A1 | 2/2015 | |
| DE | 10 2014 101341 A1 | 8/2015 | |
| DE | 10 2014 017438 A1 | 5/2016 | |
| EP | 0614025 A1 * | 9/1994 | F16D 65/18 |
| EP | 2 538 104 A2 | 12/2012 | |
| EP | 3 051 169 A1 | 8/2016 | |
| EP | 3 126 703 A1 | 2/2017 | |
| EP | 3260721 A1 * | 12/2017 | F16D 55/2255 |
| GB | 2035485 A * | 6/1980 | F16D 65/567 |
| KR | 20150024455 A | 3/2015 | |
| WO | WO-2010012427 A1 * | 2/2010 | F16D 65/567 |
| WO | WO-2013143979 A1 * | 10/2013 | F16D 65/568 |
| WO | 2015096971 A3 | 8/2015 | |
| WO | WO-2019057264 A1 * | 3/2019 | F16F 1/042 |

* cited by examiner

Fig. 7 excellent# DISC BRAKE HAVING AN ACTUATION DEVICE

TECHNICAL FIELD

The invention relates to an adjustment device for a disc brake for adjusting the wear on brake pads. The adjustment device comprises a guide sleeve in which a wrap spring is arranged, a groove ring which surrounds the guide sleeve, wherein the groove ring is coupled to a closure cap via a torsion spring, and an opening ring surrounding the groove ring.

BACKGROUND

Actuation devices with an adjustment device for adjusting the air gap between the brake pad and the brake disc have been known for a long time. In general, such disc brakes can usually be actuated pneumatically or electromechanically.

In the field of commercial vehicles, there are, for example, mechanical adjustment devices for truck disc brakes. The actuation devices in disc brakes have the purpose of providing an even air gap in all driving situations or braking situations, which in turn requires a very high precision in the adjustment. The air gap is the distance between the brake pads and the brake disc. On actuation of the brakes, the existing air gap must be overcome by means of the actuation device to bring the brake pad into contact with the brake disc. The air gap is for example decisive for the pivot range of a rotary lever serving for actuation, and hence for the maximum brake force or brake force reserves which can be applied. If the air gap deviates from the setpoint value during braking of a vehicle, the adjustment device is actuated. In other words, in the case of a deviation from the setpoint value, i.e. an increase in the air gap because of wear of the brake pads and/or brake disc, the brake pads are automatically adjusted by means of the adjustment device. Adjustment may take place for example by an adjustment movement of pressure pistons.

One possibility is disclosed in EP3051169 A2, in which the wrap spring, on the side facing away from the rotary lever, rests on a washer. This prevents an axial shift in the direction of the brake disc.

EP3126703 A1, however, has two wrap springs which are arranged inside a sleeve and rest axially on the sleeve in the direction of the brake disc.

The same manner of support as shown in EP3126703 is also used in DE202014002459 U1. However, here an overrun spring rests on an inner receiving sleeve.

DE102014101341 A1 in turn describes a support of the wrap spring radially against an adjustment element, longitudinally in the direction of the brake disc.

Another adjustment device is disclosed for example in DE102014017438 A1. Here, the adjustment device has a wrap spring with a protruding spring end which engages in a retaining opening on the guide sleeve or surrounds a protrusion of the guide sleeve as a loop in the circumferential direction. The wrap spring is thus axially fixedly positioned. Between the guide sleeve and the protruding spring end of the wrap spring, a space or gap is present in the circumferential direction, which cannot be compensated by wear adjustment of the brake pads. The result is a longer response time of the disc brake. The brake pads therefore require more time to overcome the air gap before they come into contact with the brake disc. The air gap is present between the brake pads and the brake disc and prevents the brake pads from rubbing on the brake disc in the unbraked state.

SUMMARY

The invention is therefore based on the object of overcoming the disadvantages from the prior art, and of providing an adjustment device and a method for an adjustment device which prevent an increase in the air gap between the brake pads and the brake disc.

The object is achieved according to the invention in that the adjustment device has an intermediate ring for overcoming the play between a guide sleeve and a wrap spring.

By overcoming the play between the guide sleeve and the wrap spring, during the braking process the distance between the brake pads and the brake disc is reduced or completely overcome. This improves the response time. The response time is the time for overcoming the air gap from the starting position of the brake pads until they come into contact with the brake disc. Also, the braking forces are higher since the play between the wrap spring and the guide sleeve need not be overcome during an actuation process of the disc brake. The braking force is the force with which the brake pads bear on the brake disc during a braking process.

In a further advantageous embodiment, the intermediate ring has at least one lug for supporting the wrap spring in the circumferential direction. Two channel-like depressions, also known as creases, are formed in the intermediate ring next to each other with a defined spacing. The spacing must be sufficiently wide to ensure that the wrap spring can move freely taking into account deformations. The lug may be designed as wide as a U-shaped elevation of the wrap spring allows, without the wrap spring being clamped in the two creases. The intermediate region of the first crease and the second crease forms the lug. The creases may have a different shape or be configured differently. The lug does not therefore protrude from the intermediate ring or is not molded on the intermediate ring.

Also, advantageously the intermediate ring has at least one stop against twisting of the groove ring in the circumferential direction. The stop is formed protruding from the intermediate ring against the direction of the lug. The groove ring rests on the stop, wherein the stop has a stop face on which the groove ring bears. The stop face is preferably formed flat.

In addition, advantageously the intermediate ring has at least one delimiter for preventing a movement of the opening ring in the axial direction. The delimiter is arranged or molded radially on the intermediate ring, opposite the direction of the lug of the intermediate ring. The delimiter is advantageously configured as a square or rectangular body. The delimiter may however also assume any arbitrary form which prevents movement of the opening ring in the axial direction, i.e. in the direction of the intermediate ring.

It has also proved advantageous if the intermediate ring consists of a single cohesive molding or an open molding. The intermediate ring is preferably made of metal. It may however also be made of a plastic or other material. The intermediate ring is a cohesive molding when the intermediate ring is cut from a tubular body or has been separated from a tubular body. An open intermediate ring means an intermediate ring in which a strip is cut, punched or separated from a plate, and in a further step the strip is formed into an intermediate ring. The intermediate ring has a first and a second end portion which are not connected together or not closed. The open intermediate ring thus remains expandable, whereby it can be attached to guide sleeves of different diameters.

In a further advantageous embodiment, the intermediate ring on the inside has at least one protrusion, preferably four protrusions, for fixing the intermediate ring to the guide sleeve in the radial direction.

The protrusion is advantageously formed from the intermediate ring. It is conceivable that the protrusion is formed by means of a pressing process, punching process or casting process. In the pressing process, the intermediate ring is pushed over the guide sleeve, brought into position and then pressed together with the guide sleeve. The protrusions are also formed in the pressing process. The protrusion may however also be arranged as an additional component on the inside the intermediate ring. The protrusion of the intermediate ring is then arranged in a corresponding depression in the guide sleeve. Instead of one protrusion, at least two protrusions are also conceivable which prevent a movement in the axial direction and in the circumferential direction. In addition, the intermediate ring may advantageously be connected to the guide sleeve via a weld connection. The intermediate ring is thus positioned on the guide sleeve and then welded by means of a corresponding tool, so that movement of the intermediate ring in the axial direction and circumferential direction is no longer possible. It is furthermore conceivable that the intermediate ring is connected to the guide sleeve via a bonded connection. The bonded connection is an inseparable connection, so the intermediate ring is fixedly connected to the guide sleeve both axially and in the circumferential direction. To avoid movement of the intermediate ring in the axial direction, it is also conceivable that, at an axial end opposite a closure cap in the circumferential direction, the guide sleeve advantageously has a flange on which the intermediate ring rests. The flange of the guide sleeve secures the intermediate ring against axial slippage from the guide sleeve, and prevents the intermediate ring from seizing to the wrap spring. Firstly, the intermediate ring is also secured against slipping down from the guide sleeve, and secondly this facilitates mounting. The intermediate ring and the groove ring may thus be pushed onto the guide sleeve successively from the other side, i.e. opposite the side with the flange, without the intermediate ring and/or guide ring being able to slip down on the other side opposite the insertion side.

The object is also achieved by a method for arranging the intermediate ring on the guide sleeve. The mounting sequence depends on the design of the adjustment device. Thus the mounting sequence for the adjustment device in which the guide sleeve has a flange differs from that for the adjustment device in which the intermediate ring is attached to the guide sleeve by means of a crimping process and the closure cap is already welded to the guide sleeve. For this, the intermediate ring is arranged on the guide sleeve after the wrap spring has been arranged in the guide sleeve. In addition, the intermediate ring is arranged on the guide sleeve before the groove ring is arranged on the guide sleeve. Arrangement of the intermediate ring after arrangement of the groove ring facilitates positioning of the intermediate ring on the guide sleeve. In the further step, the lug of the intermediate ring is guided through a U-shaped elevation of the wrap spring. Then the intermediate ring is tightened in the circumferential direction and closes the gap between the guide sleeve and the wrap spring. The U-shaped elevation of the wrap spring here rests in the circumferential direction on the lug of the intermediate ring and on a stop on the guide sleeve. Then advantageously, the at least one protrusion of the intermediate ring is pressed into a depression in the guide sleeve. Where no protrusion is present on the intermediate ring, the intermediate ring may be welded or bonded to the guide sleeve. Furthermore, it is also conceivable that the intermediate ring rests axially on the flange of the guide sleeve. It is also conceivable that the intermediate ring is pressed onto the guide sleeve and rests on a flange of the guide sleeve.

Selected examples of the invention are explained below with reference to the attached figures.

DETAILED DESCRIPTION OF THE DRAWINGS

Figure 1:
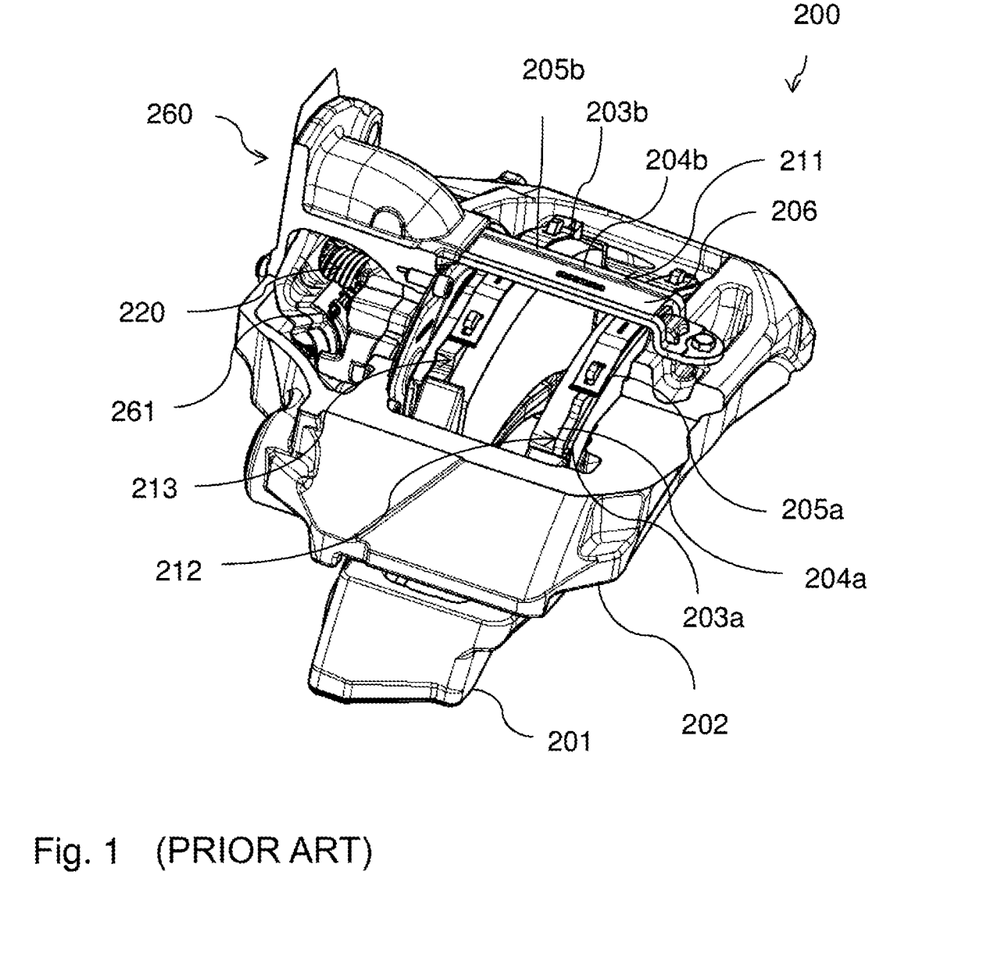
FIG. 1 shows a disc brake with an adjustment device according to the prior art.

FIG. 1 shows an illustration of the disc brake 200 for a truck, with a partial view of an actuation device 260. The disc brake 200 has a brake caliper 202 and a brake carrier 201. The brake caliper 202 is configured as a floating caliper. Furthermore, the disc brake 200 has a first pad carrier 203*a* and a second pad carrier 203*b* for holding the friction linings 204*a*, 204*b*. The first pad carrier 203*a* and the first friction lining 204*a* are referred to as the first brake pad 212. The second pad carrier 203*b* and the second friction lining 204*b* are known as the second brake pad 213. A retaining system 211, comprising a first retaining spring 205*a*, a second retaining spring 205*b* and a retaining yoke 206, prevents the brake pads 212, 213 from slipping out in the radial direction. Via the actuation device 260, the brake pads 212, 213 are actuated, i.e. applied against a brake disc (not shown) when the brakes are operated. The actuation device 260 comprises a rotary lever 261 for applying the brake pads 212, 213, and an adjustment device 220 for setting the air gap between the brake disc and the brake pads 212, 213.

Figure 2:
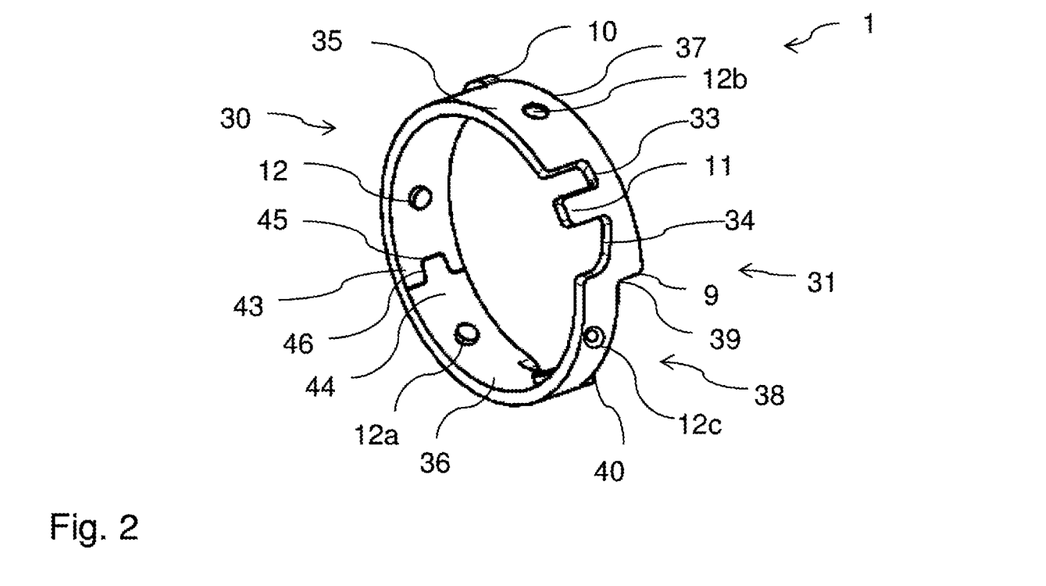
FIG. 2 shows, from a first side perspective, an intermediate ring made of a composed molding.

FIG. 2 shows an intermediate ring 1 with a front side 30 and a rear side 31, which is formed as a composed molding. The intermediate ring 1 is made as a metal part and has an inner diameter of 39.6 mm. The outer diameter of the intermediate ring is 43.6 mm. The wall thickness of the intermediate ring 1 in the exemplary embodiment is 2 mm. The intermediate ring 1 has a lug 11, a stop 9, a delimiter 10, a first protrusion 12, a second protrusion 12*a*, a third protrusion 12*b* and a fourth protrusion 12*c*. The lug 11 is formed from the intermediate ring 1 axially in the direction of the front side 30. For this, a first crease 33 and a second crease 34 are formed axially from the front side 30 in the direction of the rear side 31. The minimal distance between the first crease 33 and the rear side 31 is 3.5 mm. The minimal distance between the second crease 34 and the rear side 31 is also 3.5 mm. The first crease 33 and the second crease 34 are formed parallel in the circumferential direction. The first crease 33 has a rectangular form. The second crease 34 is formed trapezoid. Furthermore, the delimiter 10 of the intermediate ring 1 is formed radially on an outer face 35 of the intermediate ring. Also, the delimiter 10 is arranged on the rear side 31, at an edge region 37 of the intermediate ring 1. The delimiter 10 is not an additionally attached component but part of the intermediate ring 1. Furthermore, a stop 9 is punched out of the intermediate ring 1 on the rear side 31 of the intermediate ring 1. A first corner 39 of a groove 38 is formed so as to be rectangular. A second corner 40 of the groove 38 has an angle which is greater than 45°, preferably between 45° and 90°. The axial wall of the first corner 39 is the stop 9. The first protrusion 12, the second protrusion 12*a*, the third protrusion 12*b* and the fourth protrusion 12*c* are formed from the intermediate ring 1 on an inner face 36 of the intermediate ring 1. The protrusions 12, 12*a*, 12*b*, 12*c* were formed from the intermediate ring 1 by means of a punching process. A joint 45 is formed in a first end portion 43 of the intermediate ring 1, centrally in the circumferential direction. An abutment 46 of a second end portion 44 engages in the joint 45. The abutment 46 is punched out of the second end portion 44. The intermediate ring, with all contours e.g. the lug 11 or delimiter 10, is first punched out of a flat steel strip (plate), rolled into a ring and then connected to the joint 45 by form fit at the abutment 46. The protrusions 12, 12*a*, 12*b* are only punched or pressed out of the intermediate ring, by means of a punching tool or pressing tool after positioning of the intermediate ring 1 on the guide sleeve 3.

Figure 2A:
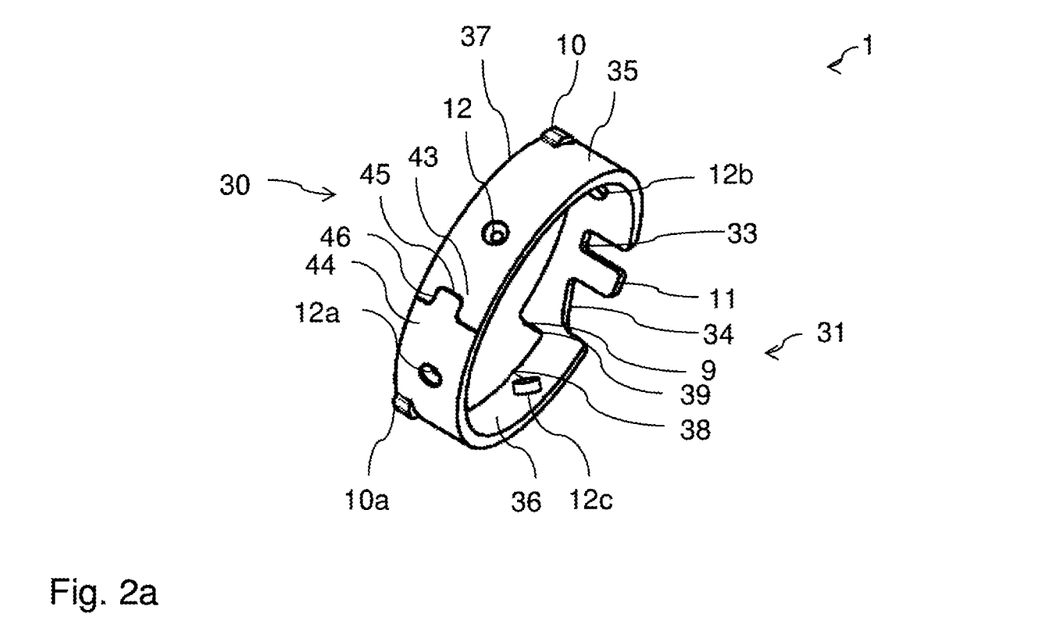
FIG. 2*a* shows, from a second side perspective, an intermediate ring according to the invention made of a composed molding.

FIG. 2*a* shows the intermediate ring 1 from FIG. 2 from a further side perspective. Instead of the intermediate ring 1 having one delimiter 10, as shown in FIG. 2, the intermediate ring 1 according to FIG. 2*a* has a second delimiter 10*a* in addition to the delimiter 10.

Figure 2B:
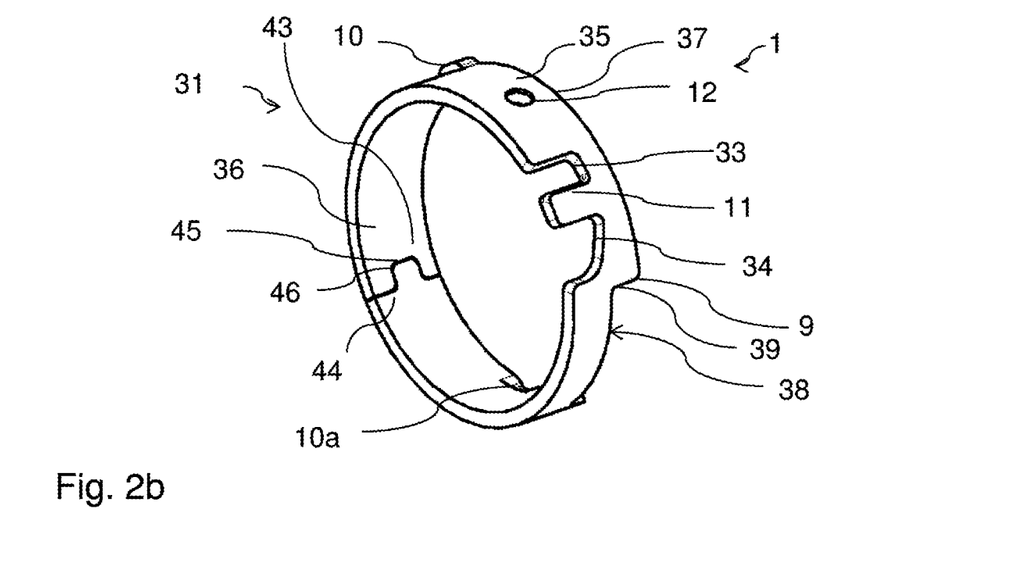
FIG. 2*b* shows, from a second side perspective, an intermediate ring according to the invention made of a composed molding with a protrusion.

A further possibility for configuring the intermediate ring 1 according to FIG. 2*a* is shown in FIG. 2*b*. In contrast to FIG. 2*a*, the intermediate ring has only one protrusion 12.

Figure 2C:
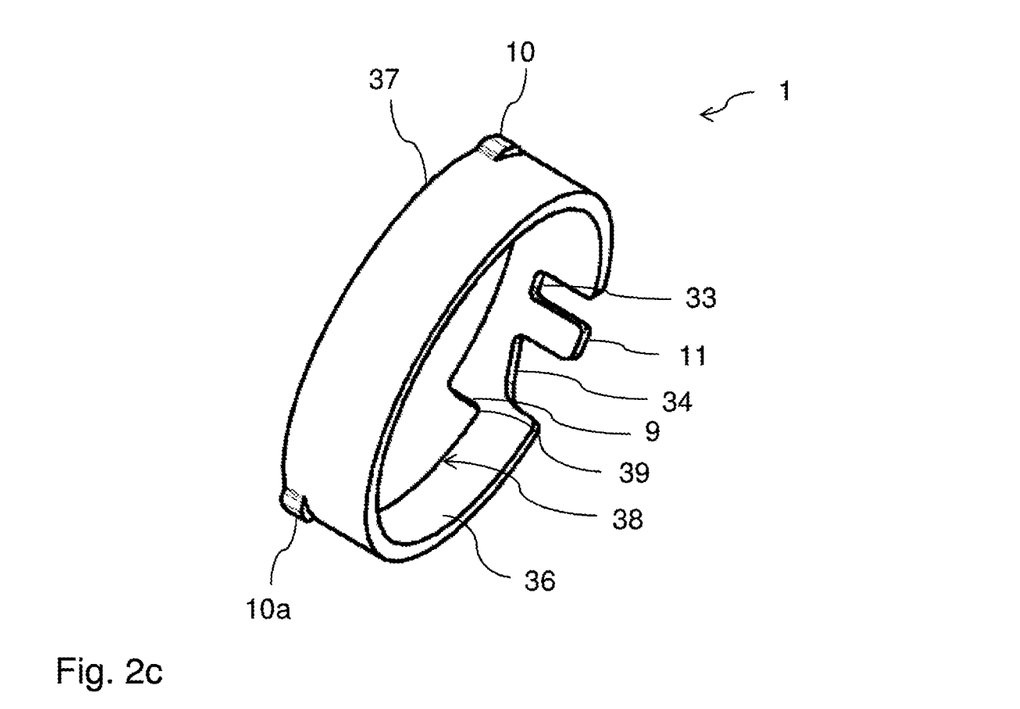
FIG. 2*c* shows an intermediate ring according to the invention as a cohesive molding.

In FIG. 2*c*, the intermediate ring 1 is shown as a cohesive molding. The intermediate ring 1 in this exemplary embodiment was cut from a metal tube. Additional working steps, which are required in the embodiments according to FIGS. 2, 2*a* and 2*b*, are no longer required. Furthermore, the intermediate ring 1 according to FIG. 2*c* has all features of the intermediate ring 1 according to FIG. 2*a* with the exception of the protrusions 12, 12*a*, 12*b*, 12*c*. The meaning of the reference signs corresponds to the meaning of the reference signs in FIG. 2*a*.

Figure 3:
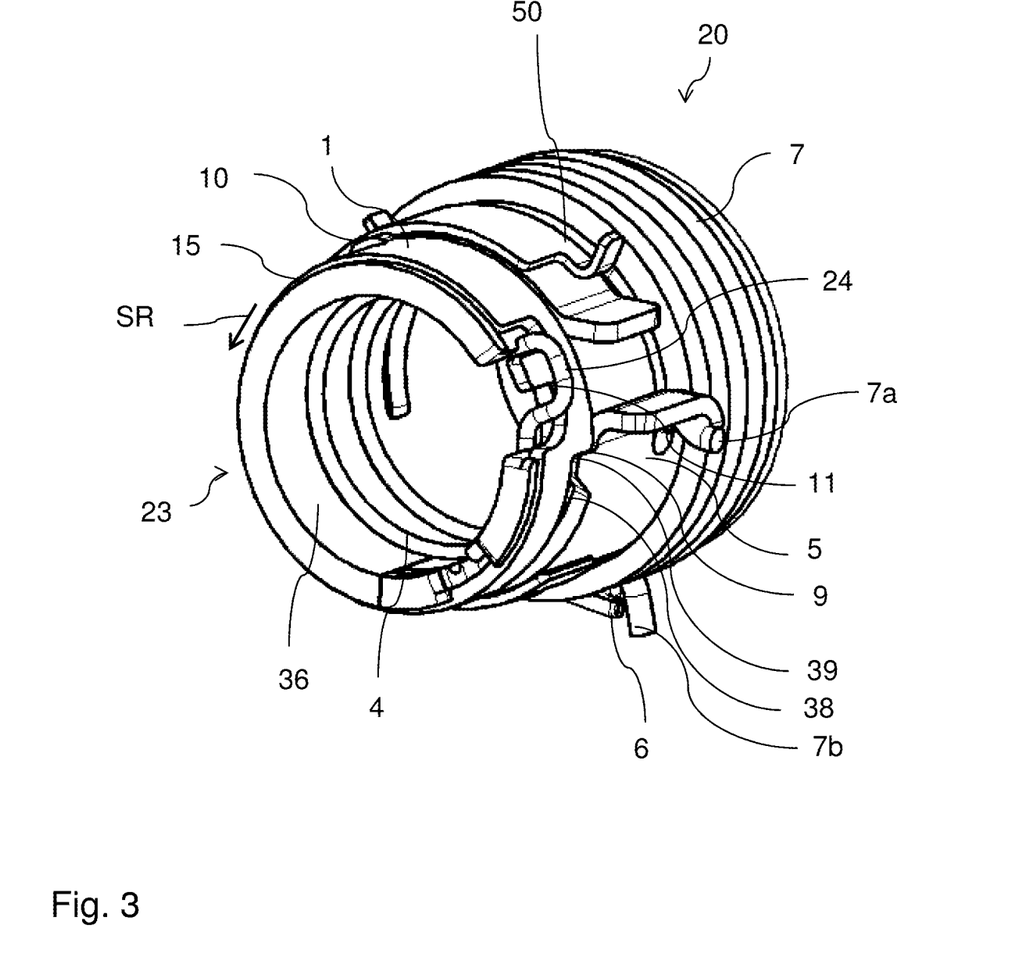
FIG. 3 shows, in a rotated side perspective, an adjustment device with an intermediate ring according to the invention as shown in FIG. 2*c*.

FIG. 3 shows how the intermediate ring 1 according to FIG. 2*c* is arranged on an adjustment device 20 of a disc brake. The adjustment device 20 has a guide sleeve 3 which, at one end in the circumferential direction, has a flange 15 formed from the guide sleeve, on which the intermediate ring 1 rests axially. The flange 15 is oriented radially towards the outside opposite the guide sleeve 3. A wrap spring 4 is arranged in the guide sleeve 3. The wrap spring 4 has a U-shaped elevation 24 through which the lug 11 of the intermediate ring 1 reaches. The circumferential direction is defined in FIG. 3 as the blocking direction SR. In the first corner 39 of the groove 38 of the intermediate ring 1, a groove ring 5 rests on the stop 9 in the blocking direction SR. The groove ring 5 surrounds the guide sleeve 3. A first end 7*a* of a torsion ring 7 is in engagement with the groove ring 5. A second end 7*b* of the torsion spring 7 is in engagement with a closure cap 6. The torsion spring 7 has a preload force. The preload force of the torsion spring 7 tensions the intermediate ring 1 in the blocking direction SR and closes a gap S between the guide sleeve 3 and the wrap spring 4. The wrap spring 4 is thus clamped between the guide spring 3 and the lug 11 of the intermediate ring 1. Also, an opening ring 50 surrounds the groove ring 5. The opening 50 allows the return of the adjustment device 20 during a pad change, to the extent that the wrap spring effect in the blocking direction SR of the wrap spring is eliminated. FIG. 3 does not show the effect of the opening ring 50, wherein the opening ring 50 presses a second end of the wrap spring 4 against a stop of the opening ring 50 and eliminates the blocking effect of the wrap spring 4.

Figure 3A:
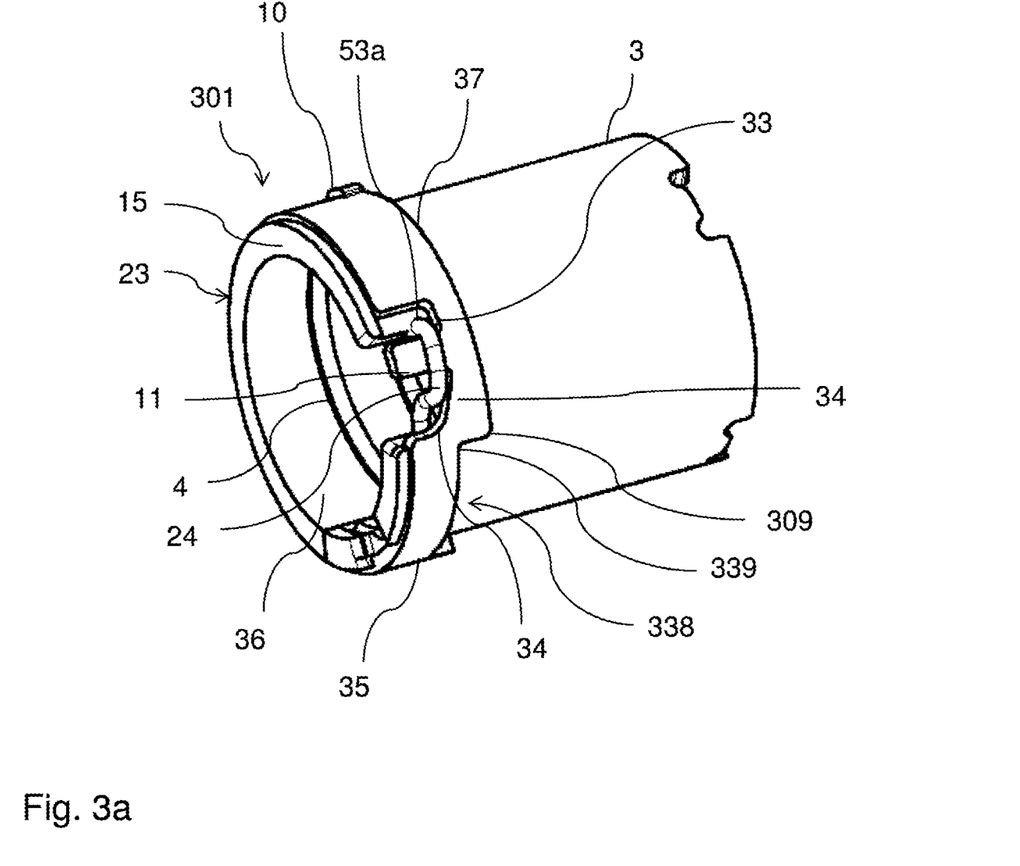
FIG. 3*a* shows a guide sleeve with an intermediate ring as shown in FIG. 3.
Figure 3B:
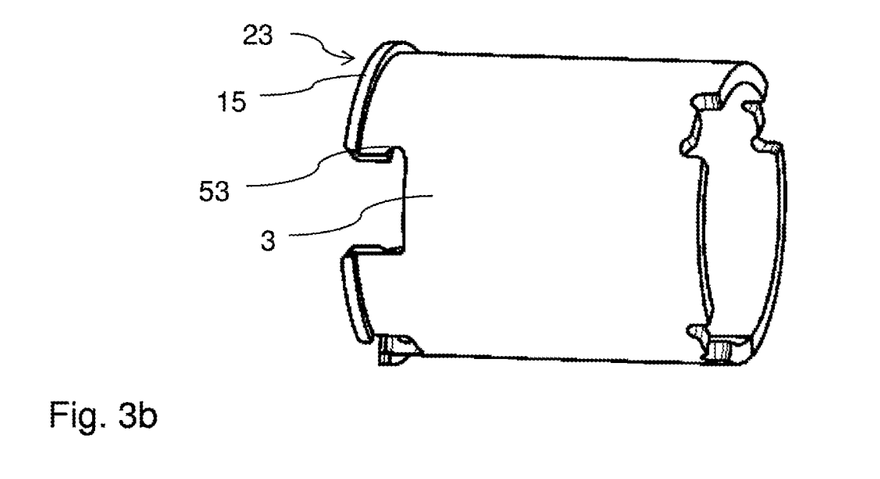
FIG. 3*b* shows a guide sleeve as shown in FIG. 3 in detail.

FIG. 3*a* shows in detail how the intermediate ring 1 is arranged on the guide sleeve 3 according to FIG. 3. FIG. 3*b* shows the guide sleeve 3 according to FIG. 3 without the intermediate ring 1. The flange 15 on which the intermediate ring 1 rests, and an undercut 53 on which the U-shaped elevation 24 of the wrap spring 4 rests, are clearly evident.

Figure 4:
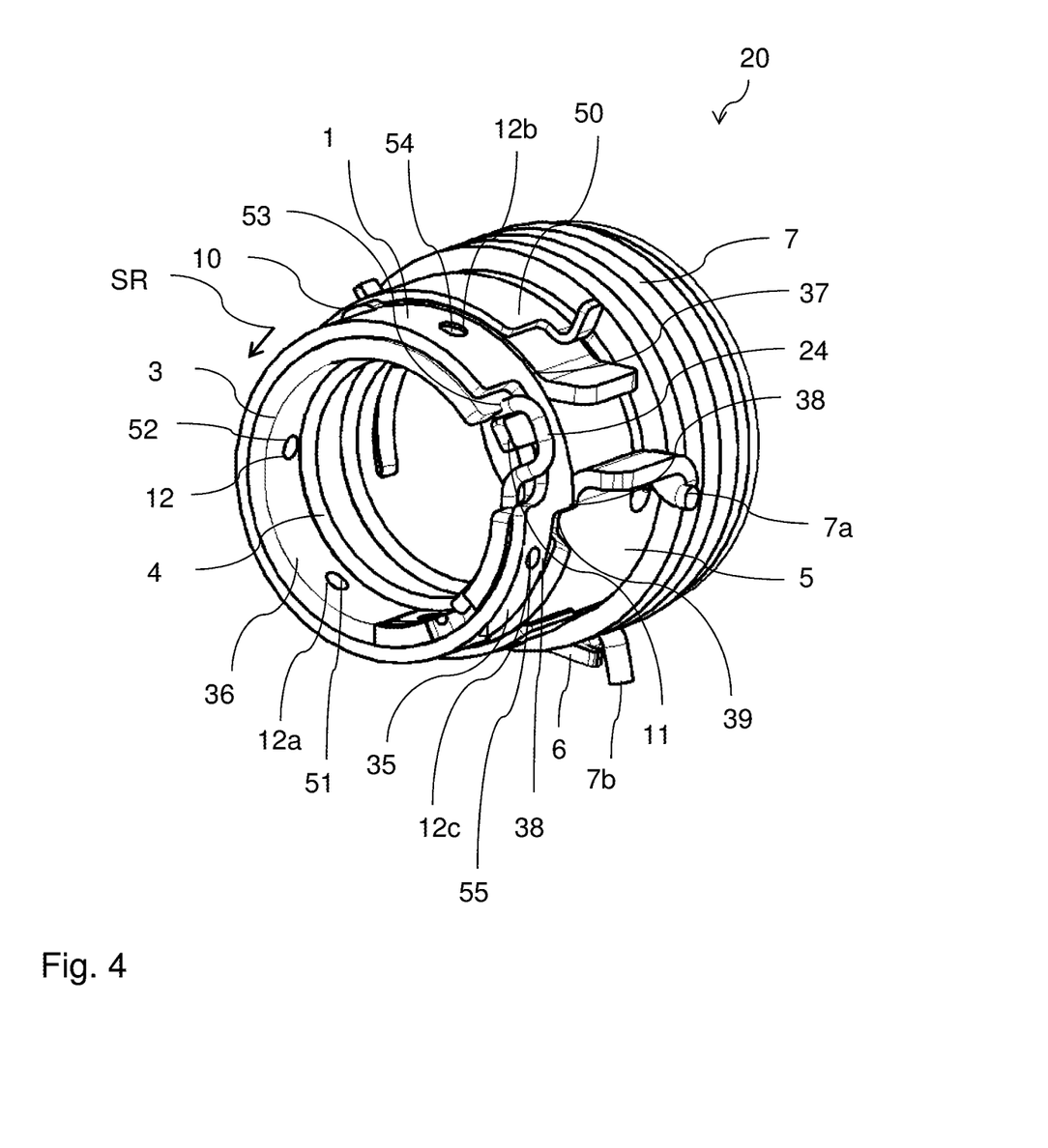
FIG. 4 shows, in a rotated side perspective, an adjustment device with an intermediate ring according to the invention as shown in FIG. 2.

FIG. 4 shows an arrangement of the intermediate ring 1 from FIG. 2 on the adjustment device 20. The adjustment device 20 has identical components to the adjustment device 20 according to FIG. 3 except for the guide sleeve 3 and the intermediate ring 1. The guide sleeve 3 has no flange 15. FIG. 4 shows a wrap spring 4 which has a U-shaped elevation 24 through which the lug 11 of the intermediate ring 1 reaches. The U-shaped elevation 24 of the wrap spring 4 rests on the undercut 53 of the guide sleeve 3. The guide sleeve 3 has a first hole 51, a second hole 52, a third hole 54 and a fourth hole 55 in the circumferential direction. After the intermediate ring 1 with wrap spring 4 has been positioned on the guide sleeve 3, the protrusions 12, 12*a*, 12*b* and 12*c* of the intermediate ring 1 are pressed into the holes 51, 52, 54, 55 of the guide sleeve 3. Movement of the intermediate ring 1 in the axial direction or circumferential direction is not possible. There is therefore no play S between the wrap spring 4 and the guide sleeve 3 in the circumferential direction.

Figure 4A:
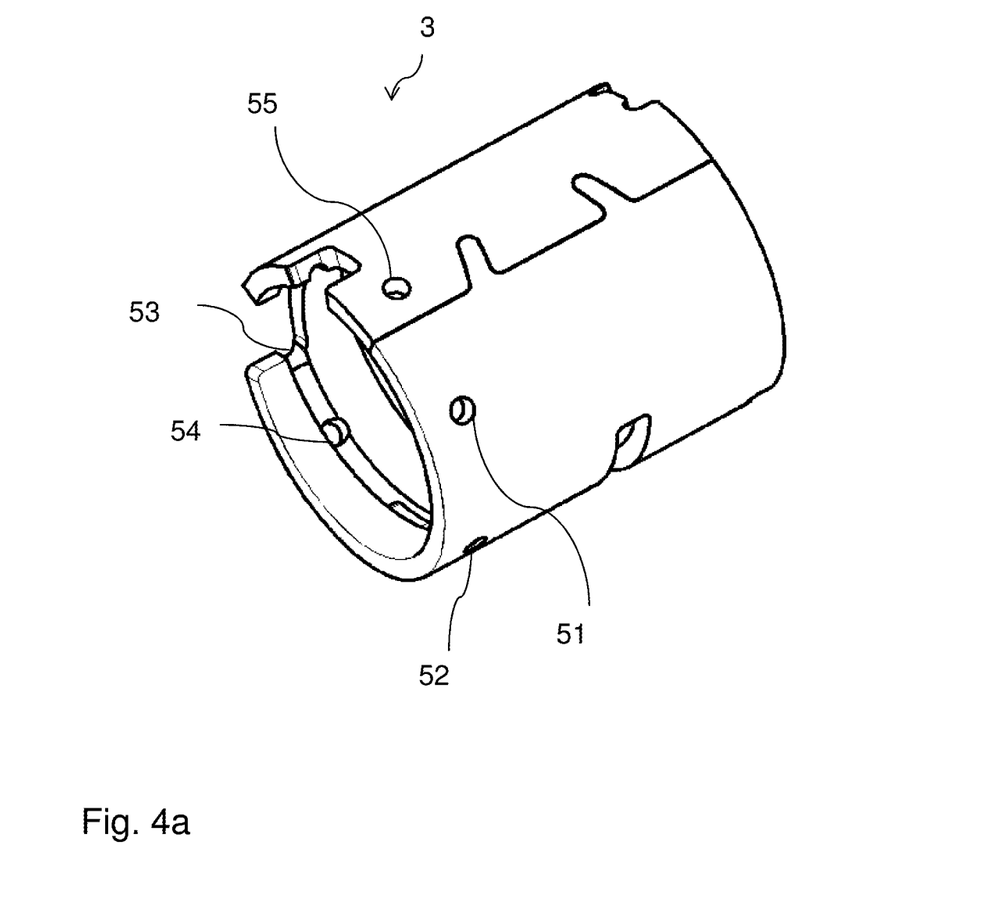
FIG. 4*a* shows a guide sleeve for an adjustment device as shown in FIG. 4 with bores in the circumferential direction.

FIG. 4*a* shows the guide sleeve 3 from FIG. 4 in detail. In particular, the bores 51, 52, 54, 55 and the undercut 53 are visible.

Figure 5:
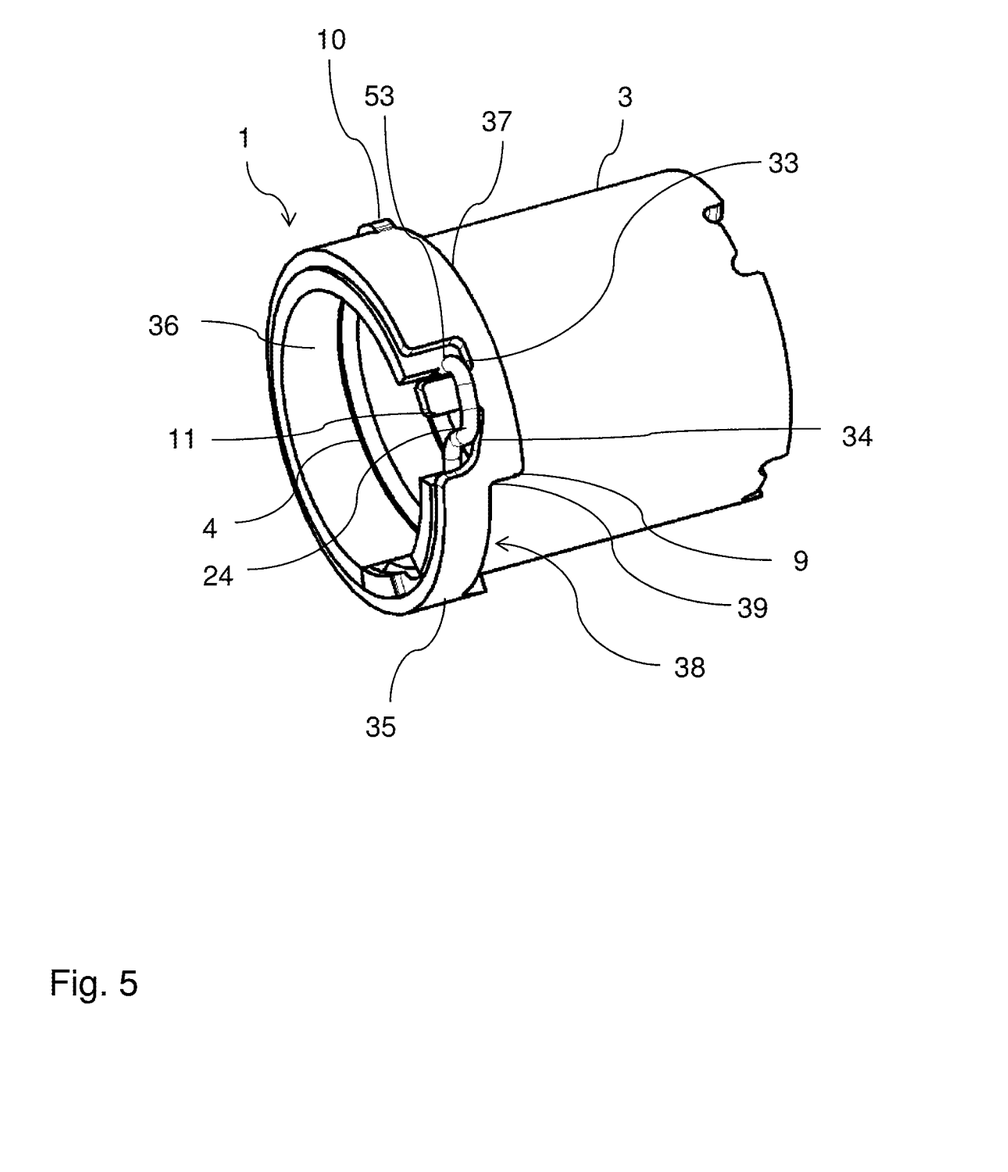
FIG. 5 shows a guide sleeve for an adjustment device with a welded intermediate ring.

FIG. 5 shows a further possibility for arranging the intermediate ring 1 on the guide sleeve 3 of the adjustment device 20. The intermediate ring 1 corresponds to the intermediate ring 1 in FIG. 2*c*. Therefore the intermediate ring 1 has a stop 9, a first delimiter 10, a first crease 33 and a second crease 34, an inner face 36, an edge region 37 and a groove 38. The wrap spring 4 has a U-shaped elevation 24 through which the lug 11 of the intermediate ring 1 reaches. The U-shaped elevation 24 rests in the circumferential direction on the undercut 53 of the guide sleeve 3. The intermediate ring 1 is welded to the guide sleeve 3 against rotation in the circumferential direction.

Figure 6:
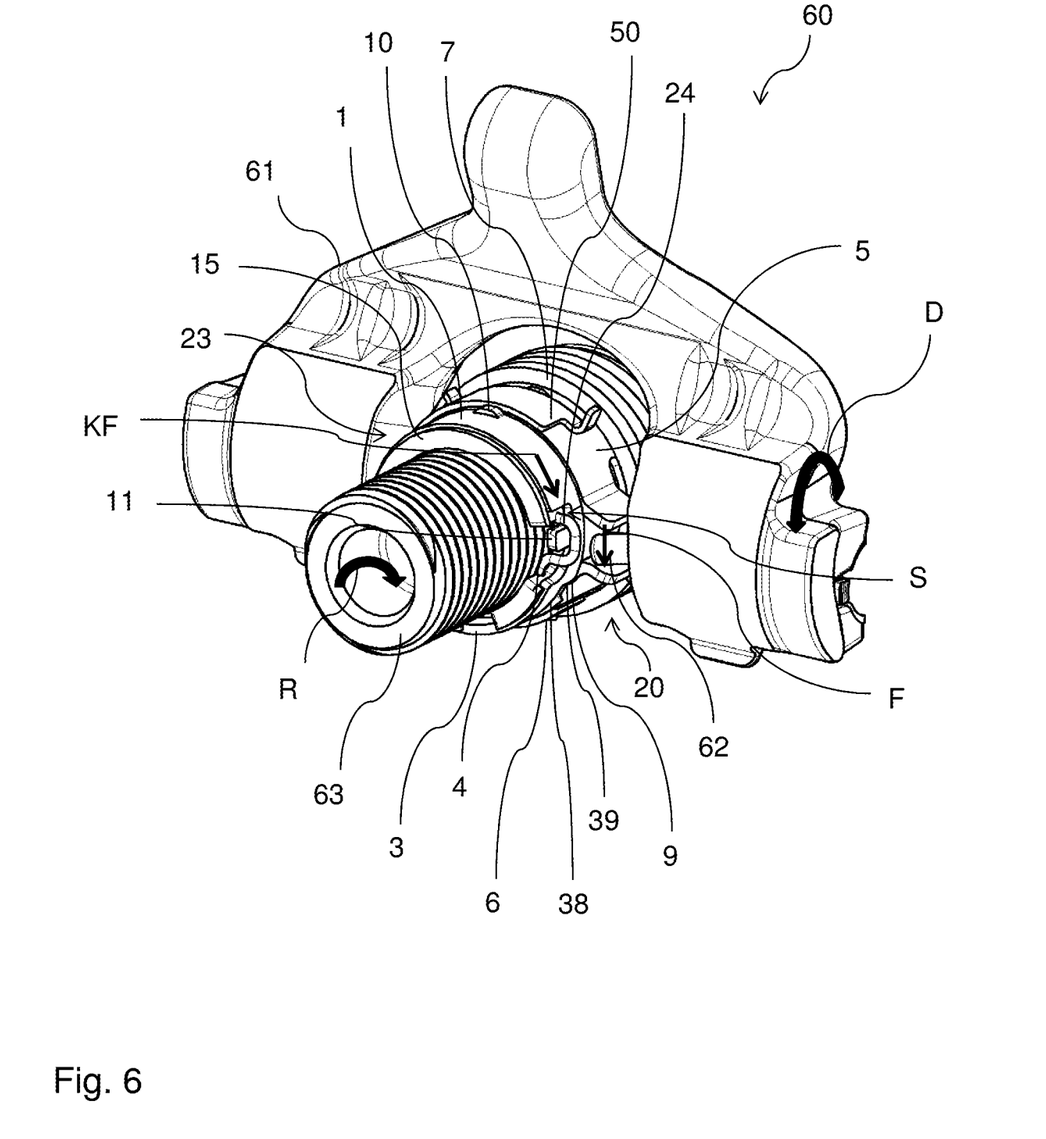
FIG. 6 shows an actuation device of a disc brake with an adjustment device and an intermediate ring according to the invention, wherein the intermediate ring rests on a flange of the guide sleeve.

FIG. 6 shows an application device 60 with the adjustment device 20 from FIG. 3 which surrounds a spindle 63, and a rotary lever 61 with a pin 62 which is in engagement with the groove ring 5 of the adjustment device 20. The intermediate ring 1 rests axially on the flange 15 of the guide sleeve 3. To overcome the air gap between the brake pads and the brake disc, during a braking process the pin 62 presses on the groove ring 5 in the direction of a rotary movement D of the rotary lever 61. The spindle 63 thus turns in the rotation direction R. After overcoming the air gap, the spindle 63 can turn no further in the rotation direction R since the brake pads bear on the brake disc. The torsion spring 7 turns in the rotation direction R. By rotation of the groove ring 5 in the rotation direction R, the groove ring 5 no longer bears on the stop 9 of the intermediate ring 1. The groove ring 5 therefore no longer presses against the intermediate ring 1, whereby the intermediate ring 1 no longer bears on the U-shaped elevation 24 of the wrap spring 4. The guide sleeve 3 is connected to the groove ring 5 via the closure cap 6 and the torsion spring 7. A force of the guide sleeve KF acts on the wrap spring 4 and prevents the play S between the wrap spring 4 and the guide sleeve 3. After the end of the braking process, the rotary lever 61 is brought into its starting position. The rotary lever 61 moves opposite the rotation direction D. As a result the groove ring 5 and intermediate ring 1 move opposite the rotation direction R. The lug 11 of the intermediate ring 1 presses, opposite the rotation direction R, against the U-shaped elevation 24 of the wrap spring 4. The wrap spring 4 is accordingly clamped between the lug 11 of the intermediate ring 1 and the guide sleeve 3. A possible play S which occurs during the braking process between the wrap spring 4 and the guide spring 3 is adjusted.

Figure 7:
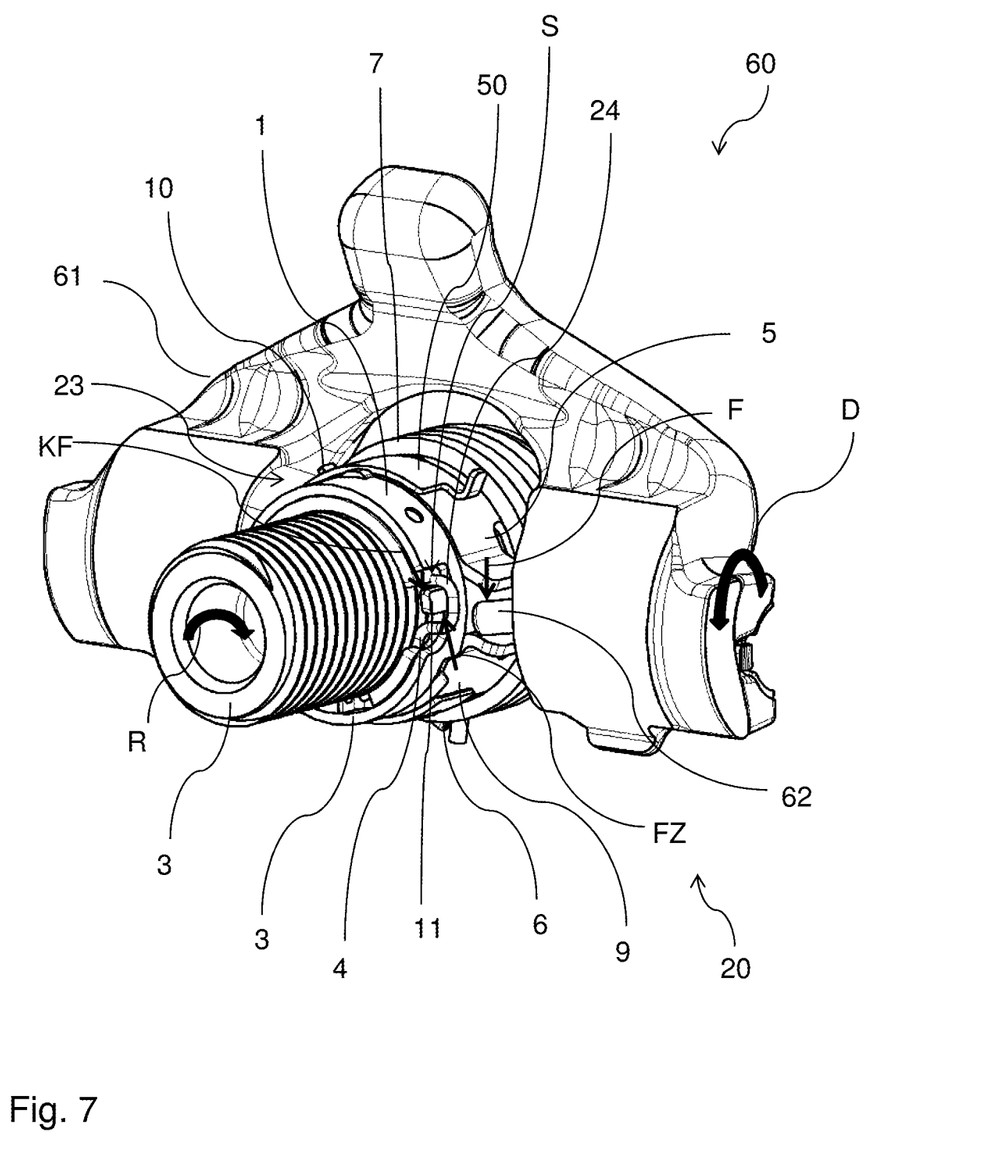
FIG. 7 shows an actuation device of a disc brake with an adjustment device and an intermediate ring according to the invention, wherein the intermediate ring is welded to the guide sleeve.

FIG. 7 shows an application device 60 with an adjustment device 20 and intermediate ring 1 according to the invention. The structure of the application device 60 and adjustment device 20 corresponds to the exemplary embodiment in FIG. 6, so is not discussed in more detail here. In the exemplary embodiment in FIG. 7, the intermediate ring 1 is welded and thus fixedly connected to the guide sleeve 3. A fixed connection means a form-fit and force-fit connection. During the braking process, the intermediate ring 1 does not also turn in the rotation direction R. The U-shaped elevation 24 accordingly remains firmly clamped between the lug 11 of the intermediate ring 1 and the guide sleeve 3. A play S between the lug 11 of the intermediate ring 1 and the guide sleeve 3 is avoided and is not therefore shown in FIG. 7. However, this exemplary embodiment has the disadvantage that a play S between the lug 11 of the intermediate ring 701 and the guide sleeve 3 can no longer be adjusted. Such a play may occur because of age-related wear phenomena at the intermediate ring 1, wrap spring 4 or guide sleeve 3.

While the above description constitutes the preferred embodiments of the present invention, it will be appreciated that the invention is susceptible to modification, variation and change without departing from the proper scope and fair meaning of the accompanying claims.

The invention claimed is:

1. An adjustment device (20) for a disc brake (200) for adjusting brake pads to compensate for wear, comprising:
a guide sleeve (3), in which a wrap spring (4) is arranged,
a groove ring (5) surrounding the guide sleeve (3), wherein the groove ring (5) is coupled to a closure cap (6) via a torsion spring (7),
an opening ring (50) surrounding the groove ring (5), and an intermediate ring (1) for overcoming a play S between the guide sleeve (3) and the wrap spring (4);
wherein the intermediate ring (1) is separate piece relative to the guide sleeve (3) and the opening ring (50).

2. The adjustment device (20) as claimed in claim 1, wherein the intermediate ring (1) has a lug (11) for supporting the wrap spring (4) in the circumferential direction.

3. The adjustment device (20) as claimed in claim 1, wherein the intermediate ring (1) has at least one stop (9) against twisting of the groove ring (5) in the circumferential direction.

4. The adjustment device (20) as claimed in claim 1, wherein the intermediate ring (1) has at least one delimiter (10, 10a) for preventing a movement of the opening ring (50) in the axial direction.

5. The adjustment device (20) as claimed in claim 1, wherein the intermediate ring (1) consists of a single cohesive molding or an open molding.

6. The adjustment device (20) as claimed in claim 1, wherein the guide sleeve (3) has an axial end (23) opposite the closure cap (6) with a circumferentially extending flange (15), on which the intermediate ring (1) rests.

7. The adjustment device (20) as claimed in claim 1, wherein the intermediate ring (1) has an inner face (36) connected to the guide sleeve (3) via a weld connection.

8. An adjustment device (20) for a disc brake (200) for adjusting brake pads to compensate for wear, comprising:
a guide sleeve (3), in which a wrap spring (4) is arranged,
a groove ring (5) surrounding the guide sleeve (3), wherein the groove ring (5) is coupled to a closure cap (6) via a torsion spring (7),
an opening ring (50) surrounding the groove ring (5), and an intermediate ring (1) for overcoming a play S between the guide sleeve (3) and the wrap spring (4),
wherein the intermediate ring (1) has an inner face (36), wherein the inner face (36) has at least one protrusion (12, 12a, 12b, 12c) for radially affixing the intermediate ring (1) to the guide sleeve (3).

9. A method for arranging an intermediate ring (3) on a guide sleeve (3), comprising the following steps:
placing a wrap spring (4) in a guide sleeve (3);
placing an intermediate ring (1) on the guide sleeve (3), the intermediate ring (1) having an inner face (36) with at least one protrusion (12, 12a, 12b, 12c); placing a groove ring (5) on the guide sleeve (3),
introducing a lug (11) of the intermediate ring (1) into a U-shaped elevation (24) on the wrap spring (4),
tightening the intermediate ring (1) in the circumferential direction and closing a gap (S) between the guide sleeve (3) and the wrap spring (4), and
further comprising at least one of the following three steps:
pressing the at least one protrusion (12, 12a, 12b, 12c) into a hole (51, 52, 53, 54) on the guide sleeve (3);
axially supporting the intermediate ring (1) on a flange (15) of the guide sleeve (3); and
welding the intermediate ring (1) to the guide sleeve (3).

* * * * *